United States Patent
Englund et al.

(10) Patent No.: US 8,644,874 B2
(45) Date of Patent: Feb. 4, 2014

(54) UPLINK POWER CONTROL FOR POWER LIMITED TERMINALS

(75) Inventors: Eva Englund, Linkoping (SE); Erik Dahlman, Bromma (SE); Anders Furuskar, Stockholm (SE); Ylva Jading, Stockholm (SE); Kristina Jersenius, Linkoping (SE); Stefan Parkvall, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 389 days.

(21) Appl. No.: 12/811,736

(22) PCT Filed: Jul. 14, 2008

(86) PCT No.: PCT/SE2008/050869
§ 371 (c)(1),
(2), (4) Date: Jul. 6, 2010

(87) PCT Pub. No.: WO2009/088335
PCT Pub. Date: Jul. 16, 2009

(65) Prior Publication Data
US 2010/0285830 A1 Nov. 11, 2010

Related U.S. Application Data

(60) Provisional application No. 61/019,335, filed on Jan. 7, 2008, provisional application No. 61/019,337, filed on Jan. 7, 2008.

(51) Int. Cl.
*H04B 7/00* (2006.01)
(52) U.S. Cl.
USPC .................................... 455/522; 455/69
(58) Field of Classification Search
USPC ..................... 455/69, 522; 370/318
See application file for complete search history.

(56) References Cited

U.S. PATENT DOCUMENTS

| 6,885,875 | B1 | 4/2005 | Benz et al. |
| 7,082,108 | B2 * | 7/2006 | Hwang et al. ................. 370/311 |

(Continued)

FOREIGN PATENT DOCUMENTS

| EP | 1249941 A1 | 10/2002 |
| JP | 11340910 A | 12/1999 |

(Continued)

OTHER PUBLICATIONS

3rd Generation Partnership Project. "Uplink Power Control for E-UTRA—Comments on Open Issues." 3GPP TSG-RAN WG1 #50bis, R1-074378, Shanghai, China, Oct. 8-12, 2007.

(Continued)

*Primary Examiner* — Raymond Dean
(74) *Attorney, Agent, or Firm* — Coats and Bennett PLLC

(57) ABSTRACT

Transmit power control methods and apparatus are disclosed. In several embodiments, a mobile terminal (200) is configured to effectively ignore 'UP' transmit power control commands in the event that the mobile terminal (200) is operating in a power-limited state. In an exemplary method for controlling transmit power at a mobile terminal (200), a plurality of transmit power control commands are received. An accumulated power control value is adjusted (350) in response to each transmit power control command that directs a negative adjustment in transmit power. However, the accumulated power control value is adjusted (350) in response to a transmit power control command that directs a positive adjustment in transmit power only if the mobile terminal (200) is not in a power-limited state. Transmit power settings for each transmission are calculated (360) based on the accumulated power control value and the one or more radio link parameters.

15 Claims, 3 Drawing Sheets

(56) References Cited

U.S. PATENT DOCUMENTS

| | | | |
|---|---|---|---|
| 7,899,480 B2 * | 3/2011 | Odigie et al. | 455/522 |
| 2003/0087660 A1 | 5/2003 | Sendonaris | |
| 2004/0102205 A1 | 5/2004 | Zhang et al. | |
| 2004/0110477 A1 | 6/2004 | Nishimura et al. | |
| 2004/0180686 A1 | 9/2004 | Nakayama | |
| 2005/0159178 A1 | 7/2005 | Agin et al. | |
| 2007/0142075 A1 * | 6/2007 | Billon et al. | 455/522 |

FOREIGN PATENT DOCUMENTS

| | | |
|---|---|---|
| JP | 2003243997 A | 8/2003 |
| JP | 2003338762 A | 11/2003 |
| RU | 22235431 C2 | 8/2004 |
| RU | 2004117217 A | 3/2005 |
| WO | 0239603 A1 | 5/2002 |
| WO | 2006015983 A1 | 2/2006 |
| WO | 2006/029403 A1 | 3/2006 |

OTHER PUBLICATIONS

3rd Generation Partnership Project. "Completion of Open Issues on Power Control Command Accumulation." TSG-RAN WG1, R1-080358, Sevilla, Spain, Jan. 14-18, 2008.

3rd Generation Partnership Project. "Completion of Open Issues on Power Control Command Accumulation." TSG-RAN WG1, R1-080882, Sorrento, Italy, Feb. 11-15, 2008.

3rd Generation Partnership Project, "Evolved Universal Terrestrial Radio Access (E-UTRA); Physical layer procedures," Technical Specification Group Radio Access Network, 3GPP TS 36.213 V8.1.0, (Nov. 2007), (Release 8).

* cited by examiner

UPLINK POWER CONTROL FOR POWER LIMITED TERMINALS

TECHNICAL FIELD

The present invention relates generally to wireless communication systems, and in particular relates to methods, apparatus, and systems for managing transmission power in a wireless communication system.

BACKGROUND

Radio access technologies for cellular mobile networks are continuously evolving to meet demands for higher data rates, improved coverage, and increased capacity. An example of recent evolution of Wideband Code-Division Multiple Access (WCDMA) technology is the so-called High-Speed Packet Access (HSPA) developed by the $3^{rd}$-Generation Partnership Project (3GPP). Further evolution of 3G systems is ongoing in 3GPP's Long Term Evolution (LTE) initiative, which includes the development and specification of new access technologies and new system architectures. An overview of the LTE system is provided in "Evolved Universal Terrestrial Radio Access (E-UTRA) and Evolved Universal Terrestrial Radio Access Network (E-UTRAN); Overall Description, Stage 2, (Release 8)", 3GPP TS 36.300, v. 8.2.0, September 2007, the contents of which are incorporated by reference herein.

One goal of the LTE initiative is that the access technology should be designed for flexibility, so that it may be used in existing frequency allocations as well as in new frequency allocations. This approach allows for easy introduction in spectrum with existing deployments. For similar reasons, LTE is designed for use with multiple duplexing solutions. Both FDD (Frequency Division Duplex) and TDD (Time Division Duplex), where uplink and downlink transmissions are separated in frequency and in time respectively are supported, to permit usage of LTE technology with paired and unpaired spectrum allocations. Furthermore, to allow for even more flexibility in using available spectrum, LTE's access technology is based on OFDMA (Orthogonal Frequency Division Multiple Access) for the downlink and Single-Carrier Frequency Division Multiple Access (SC-FDMA) for the uplink. These technologies permit finely-grained, dynamic allocation of spectrum resources to uplink and downlink communications. Thus, available resources may be dynamically adjusted based on individual user requirements as well as aggregate demand.

In wireless communication systems in general, transmitting at excessive power levels (e.g., at power levels greater than necessary to maintain a desired quality of service) should be avoided. This is generally desirable to avoid interference with other transmitted signals, and is especially desirable in a mobile terminal to maximize the time between recharges for the terminal's battery. The LTE specifications thus support a power control mechanism wherein a serving base station (an evolved Node-B, or eNodeB, in 3GPP terminology) controls a mobile terminal's transmitter output power.

The basic contours of a power control mechanism for LTE are provided in "Evolved Universal Terrestrial Radio Access (E-UTRA); Physical layer procedures," 3GPP TS 36.213, v. 8.1.0, dated Dec. 12, 2007, the contents of which are incorporated herein by reference. The defined mechanism provides that the power setting for each mobile terminal sub-frame transmission is calculated as a function of the bandwidth allocated for the sub-frame, the modulation and coding scheme allocated for the sub-frame, and a current path loss estimate. In some operating modes, the transmitter output power is further calculated as a function of a parameter representing accumulated transmit power control (TPC) commands received by the mobile terminal.

This preliminary power control mechanism specified by 3GPP is designed to address the dynamic scheduling allowed in an LTE system. The bandwidth and modulation scheme employed by the mobile terminal may change from one sub-frame to the next—to avoid transmitting at excessive power levels, the transmitter output power level must vary with these changes in resource allocations. The transmitter output power level is also dynamically adjusted to accommodate changes in propagation changes, e.g., transmission path loss. However, the power control mechanism described in the above-mentioned 3GPP specification does not handle power-limited situations adequately.

Problems with transmit power control mechanisms in power-limited situations have been recognized in other wireless communication systems. For instance, U.S. Patent Publication No. 2006/0050798, by Odigie et al., dated Mar. 9, 2006, describes the operation of a transmit power control system in power-limited circumstances for a Wideband Code-Division Multiple Access (W-CDMA) system. However, the methods and apparatus disclosed by Odigie do not address the dynamic resource scheduling permitted in LTE systems. Furthermore, the systems disclosed in Odigie do not use an accumulated TPC command parameter as required by the LTE specifications.

SUMMARY

The present invention provides methods for efficiently controlling a mobile terminal's uplink transmit power in LTE and other systems utilizing closed-loop power control. In several embodiments, a mobile terminal is configured to effectively ignore "UP" transmit power control commands in the event that the mobile terminal is operating in a power-limited state.

In an exemplary method for controlling transmit power at a mobile terminal, a plurality of transmit power control commands are received, each transmit power control command directing an adjustment in transmit power relative to a prior transmission by the mobile terminal. An accumulated power control value is adjusted in response to each transmit power control command that directs a negative adjustment in transmit power, i.e., each "DOWN" power control command. However, the accumulated power control value is adjusted in response to an "UP" power control command, i.e., a transmit power control command that directs a positive adjustment in transmit power, only if the mobile terminal is not in a power-limited state. Thus, in some embodiments, the accumulated power control value is adjusted upwards only if the provisional power setting is less than a transmit power limit for the mobile terminal. The provisional power setting is calculated from the accumulated power control value and one or more radio link parameters. The method further comprises calculating transmit power settings for each transmission by the mobile terminal based on the accumulated power control value and the one or more radio link parameters.

By ignoring the "UP" power control commands when in a power-limited state, the mobile terminal avoids accumulating power control adjustments that are generated by the serving base station while a mobile terminal is power-limited. This approach facilitates a quicker convergence to the optimal transmit power setting when the mobile terminal exits the power-limited state.

In one or more embodiments of the invention, the provisional power settings and the transmit power settings are calculated based on the accumulated power control value as well as radio link parameters which may include one or more of a transmission bandwidth, a transmission path loss estimate, and a modulation coding scheme. In some embodiments, the provisional power setting and the transmit power settings may be further calculated as a function of one or more offset values provided by the serving base station. These offset values may include one or both of a cell-specific transmit power offset and a mobile terminal-specific transmit power offset. In still other embodiments, the mobile terminal's state is monitored for the occurrence of one or more pre-determined transmit power control reset criteria; the accumulated power control value is reset to a pre-determined value in response to each occurrence.

Mobile terminals configured to implement one or more of the power control methods described herein are also disclosed.

DETAILED DESCRIPTION

In the description that follows, various aspects of the present invention are described in relation to the 3GPP's LTE standardization effort. Those skilled in the art will appreciate that these techniques may be applied to other wireless systems utilizing power control. Similarly, methods and apparatus may be described below in reference to an LTE mobile terminal; those skilled in the art will appreciate that the techniques described herein may be readily adapted to mobile terminals configured for use in one or more other wireless communication systems. Finally, those skilled in the art will appreciate that the term "mobile terminal," as used herein, is intended to include any of a wide variety of end-user devices, including in particular any of those devices referred to as "User Equipment," "UE," or "mobile station" by the various specifications promulgated by the 3rd-Generation Partnership or other standards groups. Further, the term "mobile station" includes wireless terminals adapted for machine-to-machine (M2M) applications, as well as wireless terminals adapted for fixed wireless communications. Those skilled in the art will thus appreciate that the mobile terminals discussed herein may comprise cellular radiotelephones with voice communications capability, data communications capabilities, or both; personal digital assistant (PDA) devices including wireless communications capability; conventional laptop and/or palmtop computers or other appliances that include a wireless transceiver; and wireless transceiver cards and modules adapted for use in host computing devices, which may or may not be portable. Thus, the following description and accompanying drawings should be viewed as illustrative of the present invention, and not limiting.

Figure 1:
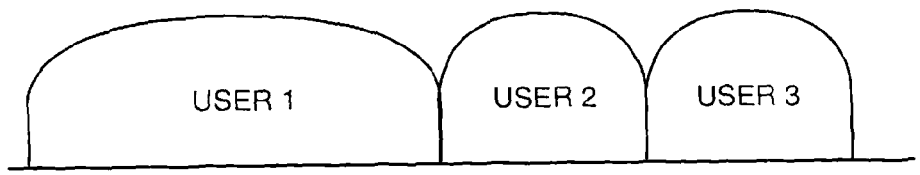
FIG. 1 illustrates an allocation of bandwidth between multiple users in an LTE system.

The LTE specification supports fast scheduling and link adaptation, in the frequency and time domains, for both uplink and downlink communications. This means that resource assignments in time and frequency can be adjusted to each user's momentary traffic demand and channel variations. In the LTE uplink, it is possible to schedule several users simultaneously (i.e., in the same sub-frame) by assigning different frequency segments to different users. However, to maintain the single carrier structure of SC-FDMA, each user can only receive a contiguous assignment in frequency. In other words, although a user may be assigned a variable number of resource blocks (an LTE resource block is defined as 12 contiguous subcarriers, each 15 kHz wide, for a sub-frame of 1 millisecond in duration), these resource blocks must be contiguous. FIG. 1 illustrates an exemplary allocation of transmit frequency resources to three users, where User 1 is assigned a considerably larger block of frequency resources than User 2 and User 3. These frequency assignments might change from one sub-frame to another, so that, for example. User 1 is assigned fewer resource blocks in a subsequent sub-frame, or no resource blocks at all.

Figure 2:
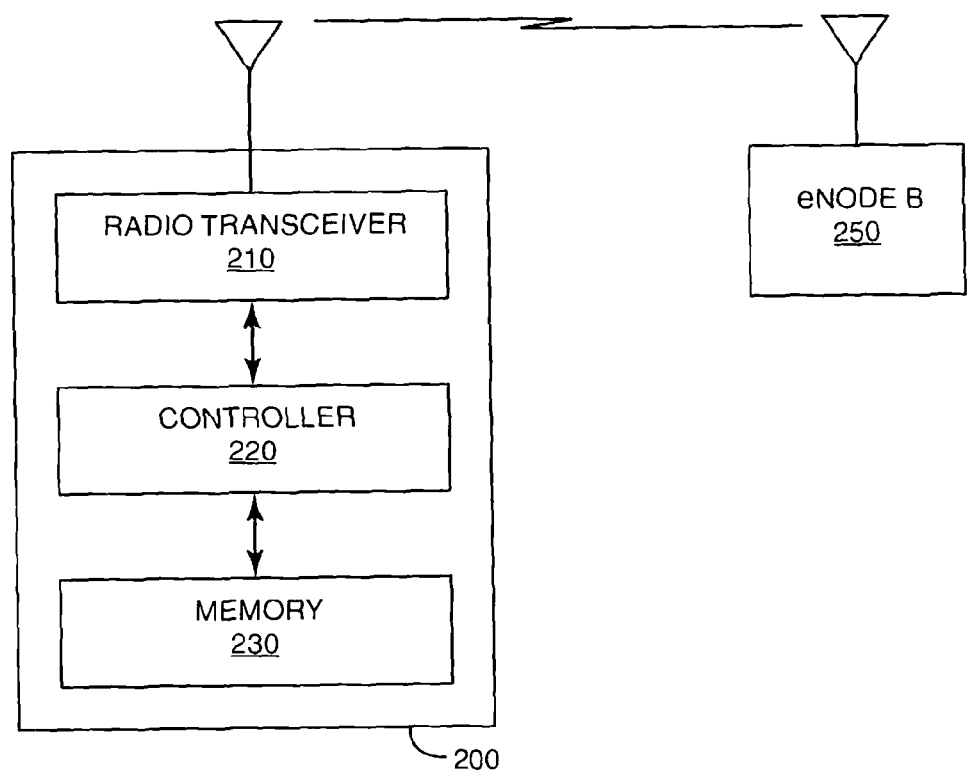
FIG. 2 a wireless system, including a mobile terminal according to one or more embodiments of the invention.

FIG. 2 provides a simplified view of a wireless communication system, including an exemplary mobile terminal 200, configured in accordance with one or more embodiments of the invention, and a base station 250. Mobile terminal 200 includes a radio transceiver 210, which in some embodiments may be configured according to the LTE specifications. In this case, serving base station 250 may comprise an evolved Node B, or eNodeB, configured according to LTE specifications. Radio transceiver 210 may also be compatible with one or more additional wireless communication standards, including wide-area wireless network standards such as Wideband CDMA or GSM, or wireless local area network standards such as one or more of the IEEE 802.11 family of standards. Mobile terminal 200 further includes a controller 220; the functions of controller 220 may include the processing of scheduling grant information and transmit power control (TPC) commands received from the base station, and the determination of power output settings for transmissions by radio transceiver 210 to base station 250. In particular, as will be described in more detail below, controller 220 may be configured in some embodiments to adjust an accumulated power control value in response to each TPC command that directs a negative adjustment in transmit power, i.e., "DOWN" TPC commands, but to adjust the accumulated power control value in response to each TPC command that directs a positive adjustment in transmit power ("UP" TPC commands) only if a provisional power setting calculated from one or more radio link parameters and the unadjusted accumulated power control value indicates that the mobile terminal is not power limited. Controller 220 is further configured to calculate transmit power settings for each transmission by radio transceiver 210 based on the accumulated power control value and the one or more radio link parameters.

Mobile terminal 200 also includes memory 230, which may contain software and program data for configuring controller 220 according to one or more embodiments of the invention. Memory 230 may also store one or more of the radio link parameters used by controller 220 in determining power output settings—some of these power control parameters may be statically configured, i.e., stored in memory 230 at time of manufacture, while others may be semi-statically configured, i.e., configured by signaling information received from base station 250. Memory 230 may further be used for storing the accumulated power control value according to one or more embodiments of the invention. Memory 230 may comprise one or more memory devices, including but not limited to, Flash memory, ROM, RAM (e.g., SRAM and/or DRAM), one or more disk drives, or other volatile or non-volatile memory devices.

As noted above, a basic power control mechanism for LTE is defined in "Evolved Universal Terrestrial Radio Access (E-UTRA): Physical layer procedures," 3GPP TS 36.213, v. 8.1.0, dated Dec. 12, 2007. The defined power control procedure provides that the power setting for each mobile terminal sub-frame transmission is calculated as a function of the bandwidth allocated for the sub-frame, the modulation and coding scheme allocated for the sub-frame, and a current path loss estimate. In some operating modes, the transmitter output power is further calculated as a function of a parameter representing accumulated transmit power control (TPC) commands received by the mobile terminal. If the calculated transmitter output power setting exceeds a maximum output power for the mobile terminal, then the mobile terminal transmits at the maximum level. Thus, a transmit power setting for transmissions on the LTE physical uplink shared channel (PUSCH) is calculated as:

$$P_T(i) = \min\{P_{MAX}, 10 \cdot \log(BW[i]) + \Delta_{MCS}(MCS[i]) + \alpha \cdot PL + P_{OFFSET} + TPC_{accum}\} \quad (1)$$

where $P_T(i)$ is the power setting for sub-frame i, in dBm, $P_{MAX}$ is the maximum output power allowed for the mobile terminal, $BW[i]$ is the allocated bandwidth for sub-frame i, in terms of LTE resource blocks (an LTE resource block is 180 kHz wide), $\Delta_{MCS}(MCS[i])$ is a table entry providing a power level offset for a given modulation/coding scheme MCS[i] PL is a downlink path loss estimate, $\alpha$ is a cell-specific parameter provided to the mobile terminal via higher-layer signaling, $P_{OFFSET}$ is an offset parameter calculated from a cell-specific offset parameter and a mobile terminal-specific parameter signaled from the eNodeB, and $TPC_{accum}$ is an accumulated power control value representing an accumulation of transmit power commands received from the serving eNodeB. A similar formula is used to compute a transmit power setting for transmissions on the physical uplink control channel (PUCCH).

The accumulated power control value $TPC_{accum}$ is maintained over time by updating it based on newly received TPC commands. These TPC commands are received over a downlink control channel in one of at least two formats. In the first format, a TPC command is received in a scheduling grant from the eNodeB. In this format, the TPC command may take on values of either [−1, 0, 1, 3] dB, or [−3, −1, 1, 3] dB, depending on semi-static configuration parameters determined by higher layer signaling. In a second format, a TPC command for the mobile terminal is jointly coded with other transmit power control commands on the downlink control channel, and may assume values according to one of the following sets, again according to semi-static configuration parameters determined by higher layer signaling: [−1, 1] dB, [−1, 0, 1, 3] dB, or [−3, −1, 1, 3] dB. The accumulated power control value for a given sub-frame i is given by:

$$f(i) = f(i-1) + \Delta_{TPC}(i-4). \quad (2)$$

where $f(0) = 0$, and $\Delta_{TPC}(i-4)$ represents the value of the TPC command received four sub-frames earlier.

As seen in Equation (1), a mobile transmitter may be power-limited in a given sub-frame. According to Equation (1), if the power setting computed according to the bandwidth, modulation coding scheme, etc. exceeds the maximum power allowed for the mobile terminal, then the maximum power level for the terminal is used. However, the accumulation of TPC commands defined above does not provide an exception for power-limited cases. As a result, the power control commands are accumulated even when the mobile terminal is power limited.

For example, when a mobile terminal is allocated a large bandwidth, i.e., when BW[i] in the above formulation is large, and/or when the transmission path loss PL is large, the power control component $10 \cdot \log(BW[i]) + \Delta_{MCS}(MCS[i]) + \alpha \cdot PL + P_{OFFSET} + TPC_{accum}$ could be larger than the maximum transmit power. Thus, the mobile terminal is power-limited. The eNodeB may determine that the mobile terminal has not reached a targeted signal-to-noise ratio (SNR) or signal-to-interference-plus-noise ratio (SINR) and will thus instruct the mobile terminal to increase power by transmitting "UP" TCP commands, i.e., $\Delta_{TPC}(i-4) > 0$. If the power limitation situation lasts for a long time, the accumulated power control value may continue to grow without limitation. For as long as the mobile terminal is scheduled to transmit with a large bandwidth, or for as long as the path loss remains high, the mobile terminal may in fact need the maximum transmit power level. (In some scenarios, the transmit power may not be limited to such an extent that the eNodeB completely fails to receive the mobile terminal's transmissions). However, if the scheduler changes the bandwidth allocation to a smaller bandwidth, or if the radio propagation conditions change significantly, then the mobile terminal's maximum power might be too large, and the received SINR will exceed the target. Although the open-loop component of the power control formula will adjust to the new bandwidth allocation through the $10 \cdot \log_{10}(BW[i])$ component, the accumulated "UP" commands in the closed-loop component (i.e., $TPC_{accum}$) may cause a problem. If the accumulated power control value $TPC_{accum}$ is large, then the mobile terminal will continue to transmit at maximum power until the accumulated power control value is reduced through successive "DOWN" TPC commands. This might take several sub-frames; during that time the mobile terminal will transmit at unnecessarily high power levels, causing interference to other mobile terminal transmitter signals and unnecessarily draining the mobile terminal's battery.

One approach to resolving this problem would be to modify the eNodeB's power control processes. For example, the eNodeB could be configured to stop transmitting "UP" commands if the SINR does not increase in response to prior "UP" commands. Alternatively, the eNodeB could be configured to avoid transmitting "UP" commands when the bandwidth allocation is large. However, neither of these approaches is likely to result in optimal performance, because the SINR target will vary due to interference variations and the frequency selectivity of the channel. This is especially for narrow band allocations. Alternatively, the eNodeB could require the mobile terminal to transmit power reports frequently, so that the eNodeB can determine whether the mobile terminal is power limited or not. However, this approach causes considerable signaling overhead in the uplink.

An improved approach, according to one or more embodiments of the present invention, is to modify the power control procedures previously specified by the LTE initiative for the mobile terminal. In this modified procedure, for operational modes in which the transmit power setting is based on an accumulated power control value, a provisional power setting is first calculated, using the basic formulation of Equation (1). This provisional power setting is calculated based on current values for each of the several radio link parameters. However, the provisional power setting is calculated based on the previous value for the accumulated power control value. Thus:

$$P_{PROV}(i) = 10 \cdot \log(BW[i]) + \Delta_{MCS}(MCS[i]) + \alpha \cdot PL + P_{OFFSET} + TPC_{accum}(i-1) \quad (3)$$

Updating of the accumulated power control value $TPC_{accum}(i-1)$ is based on the calculated provisional power setting. In short, positive TPC commands, i.e. "UP commands" are not accumulated if the mobile terminal is already limited to its maximum output power. That is, if $P_{PROV} > P_{MAX}$, then $TPC_{accum}(i) = TPC_{accum}(i-1) + \min\{0, \Delta_{TPC}(i-4)\}$. Otherwise, the accumulated power control value is updated with any received TPC command. That is, if $P_{PROV} \leq P_{MAX}$, then $TPC_{accum}(i) = TPC_{accum}(i-1) + \Delta_{TPC}(i-4)$.

The preceding power control procedure is directly applicable to the determination of transmit power settings for transmissions by an LTE mobile terminal, such as mobile terminal 200, on the physical uplink shared channel (PUSCH). Of course, similar modifications may be made to the determination of transmit power settings for transmissions on the LTE physical uplink control channel (PUCCH). Of course, those skilled in the art will appreciate that the techniques described herein may be applied in other wireless systems, and may be modified in various ways. Thus, a more general overview of a method for controlling transmit power at a mobile terminal in a wireless communication system is provided in the flow diagram of FIG. 3.

Figure 3:
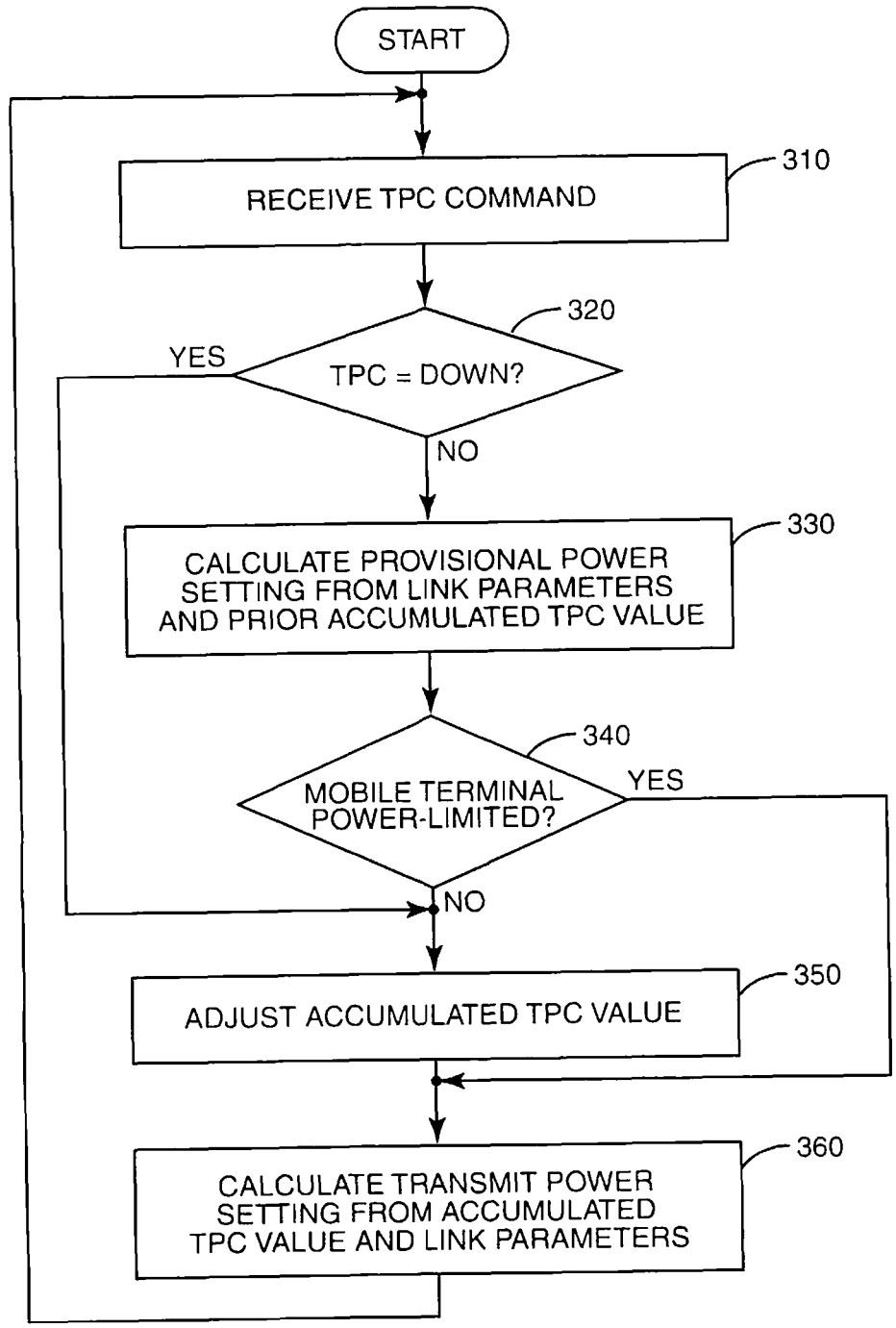
FIG. 3 is a logic flow diagram illustrating an exemplary method for controlling transmit power at a mobile terminal in a wireless communication system.

Each iteration of the logic flow of FIG. 3 begins with the receipt of a transmit power control (TPC) command from a serving base station, as shown at 310. In the LTE system described above, the TPC command could take on any of several values, depending on the current configuration of the mobile terminal. In some systems, the TPC commands may be limited to "UP" and "DOWN" commands, where "UP" and "DOWN" indicate a fixed incremental adjustment, such as 1 dB, to the previous transmission power. In others, the TPC commands may take on a wider range of values. Those skilled in the art will further note that there may be a slight delay in some systems between actual receipt of the TPC command and its use in calculating transmit power settings. For instance, in the LTE-based procedures discussed above, the transmit power setting calculation for sub-frame i is based on a TPC command received on sub-frame i–4. In other systems, the delay may be longer or shorter than this.

As discussed above with regards to LTE, the TPC commands may be received from the serving base station via a control channel. In some embodiments, the TPC commands may be transmitted according to a scheduling assignment format or a power control command format; thus, some embodiments of the present invention may be required to extract the transmit power control commands from the control channel according to either or both of these formats.

In any event, if the TPC command indicates a downward adjustment, i.e., if the directed adjustment to the previous transmit power is negative, as determined at block 320, then processing continues at block 350, where an accumulated power control value is adjusted according to the TPC command. At block 360, the transmit power setting for a current transmission is then calculated, based on the accumulated power control value and one or more radio link parameters. In the LTE setting, these radio link parameters include a transmission bandwidth allocation, modulation/coding scheme parameters, and a transmission path loss estimate. In other systems the radio link parameters may include one or more of these radio link parameters and/or one or more other radio link parameters. In some embodiments, the calculation at block 360 of the transmit power setting may also be based on one or more offset values. These offset values might include a cell-specific transmit power offset or a mobile terminal-specific transmit power offset, or both. One or more of these offset values may be received from the serving base station.

Those skilled in the art will appreciate that the transmit power setting calculated in block 360 may in some circumstances reflect a power-limited situation even if the accumulated power control value has just been adjusted downwards. However, each downward adjustment of the accumulated power control value makes the mobile terminal somewhat "less" power-limited than it would otherwise have been. After several such adjustments to the accumulated power control value, the mobile terminal may leave the power-limited state, so that subsequent TPC commands actually cause a downward adjustment in transmit power.

On the other hand, if the received TPC command indicates an upward adjustment relative to the previous transmit power, again as determined at block 320, then a provisional power setting is calculated at block 330. The provisional power setting is calculated based on the same one or more radio link parameters discussed above, but is based on a prior setting for the accumulated TPC value, e.g., the immediately previous value. Thus, the provisional power setting calculation reflects a transmit power setting assuming that the accumulated TPC value is not adjusted upward according to the current TPC command. Of course, the provisional power setting is not necessarily calculated "from scratch"—in some cases, the provisional power setting may be calculated by simply adjusting a previous provisional power setting for any changes in the radio link parameters.

At block 340, the mobile terminal determines whether it is power-limited, based on the provisional power setting. In some embodiments, the mobile terminal is determined to be power-limited if the provisional power setting is greater than the power limit for the mobile terminal. In others, the mobile terminal is deemed power-limited if the provisional power setting is greater than or equal to the mobile terminal's power limit. In either case, if the mobile terminal is power-limited, then the accumulated power control value is not adjusted, and processing passes to block 360, where the transmit power setting is calculated. In this event, of course, the transmit power setting will be the maximum permitted for the mobile terminal, since the mobile terminal is power-limited.

If, on the other hand, the provisional power setting is less than the mobile terminal's power limit, then the accumulated power control value is adjusted, at block 350, to reflect the received "UP" TPC command. The transmit power setting is calculated at block 360; the transmit power setting in this case reflects the current radio link parameters and the updated accumulated power control value.

In the method pictured in FIG. 3, it is implicitly assumed that a prior accumulated power control value exists; i.e., that a previous value for the accumulated power control value can be updated based on a received TPC command. In the LTE specification referenced earlier, the accumulated transmit power command value is initialized to zero; however, no criteria for resetting the accumulated power control values are defined. In practice, various criteria for resetting the accumulated power control values may be needed. For example, as those skilled in the art will appreciate, different cells may have different uplink/downlink path loss mismatches due to feeder losses and other deployment-related aspects. When a mobile terminal enters a new cell, any cell-specific offset values used in the calculation of the transmit power settings may be updated to reflect the new cell configuration. This may be done, for instance, by receiving new cell-specific offset values transmitted to the mobile station via the control channel. These new cell-specific offset values may then be used by the mobile terminal in subsequent power setting calculations. However, if the accumulated power control values is not reset in such a situation, adjustment of the transmit power settings to an appropriate level could be unnecessarily delayed. Indeed, since TPC commands in LTE are typically only transmitted when a mobile terminal has data for transmission, and not in advance, this may result in unnecessary hybrid automatic repeat request (HARQ) retransmissions and HARQ failures. Furthermore, if the new cell is unaware of the TPC commands sent from the first cell, the new eNodeB cannot track the mobile terminal's transmit power. There may be other situations where resetting the accumulated TPC values is advantageous, such as when a UE attempts uplink synchronization after uplink synchronization loss.

Accordingly, in some embodiments of the invention, a mobile terminal is provided with criteria for when to restart the accumulation of the TPC. For instance, an LTE mobile terminal may be configured with criteria for resetting TPC accumulation corresponding to uplink transmissions on the shared uplink channel (PUSCH). In some embodiments, the same criteria may be used to reset a separate accumulation of the uplink control channel (PUCCH) TCP commands. In others, separate criteria may be provided for resetting the accumulated TCP value for the PUCCH.

Examples of such criteria include, but are not limited to: detection of a change in serving cell; an attempt to acquire uplink synchronization after synchronization loss; a long discontinuous receive mode DRX periods—e.g., if the time since a transmission on the PUSCH or PUCCH exceeds a configured threshold; the entering or leaving of active state; receipt of a TPC command indicating that an absolute power offset, rather than an accumulated power control value, should be used in calculating the transmit power setting; and a change in one or more of system-controlled power control parameters, such as the path loss scaling factor α or the offset parameter $P_{OFFSET}$ of Equation (1). Those skilled in the art will appreciate that various criteria may also be formed by combining two or more of the above criteria (or other criteria) using logical "AND" and/or "OR" operations.

Figure 4:
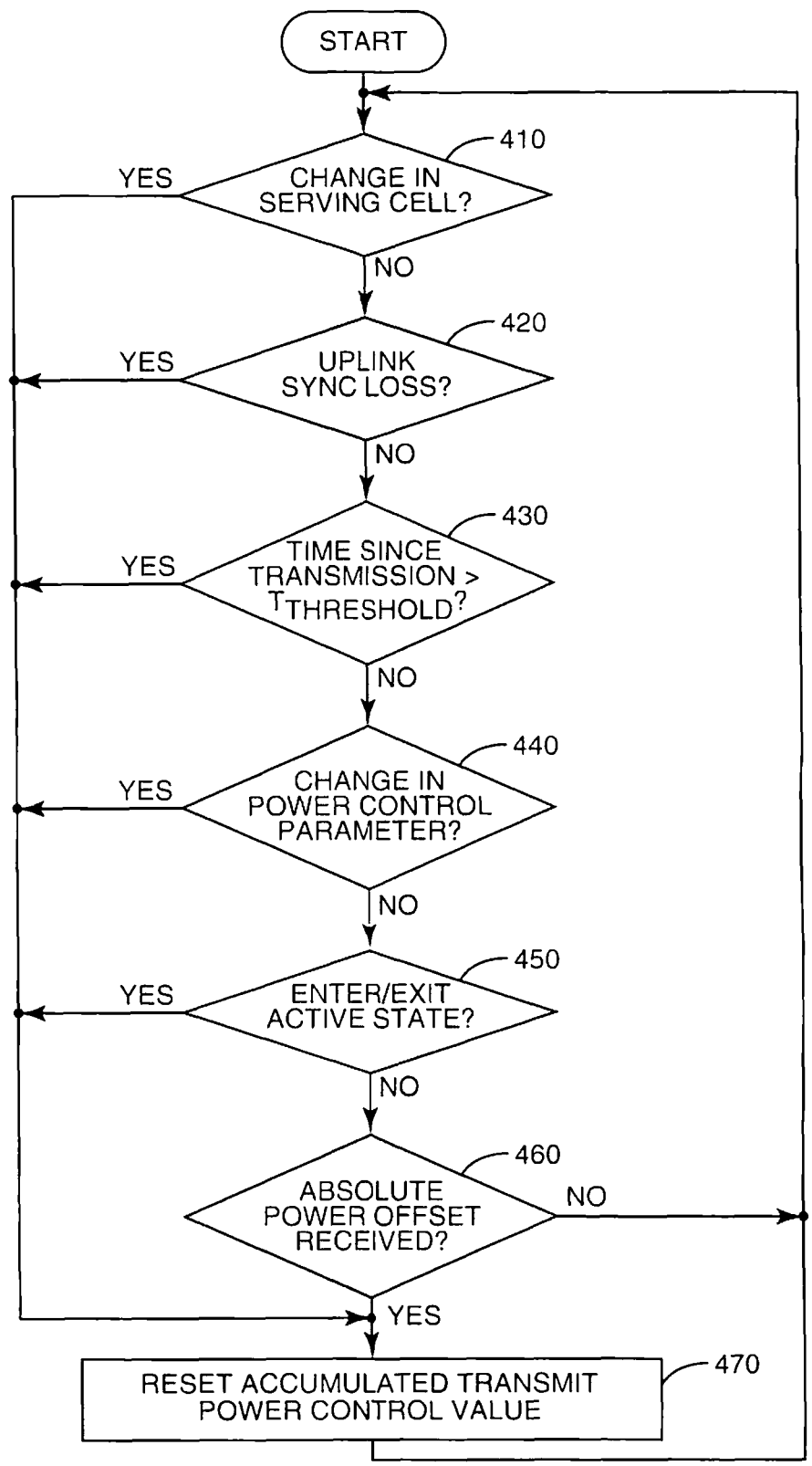
FIG. 4 is a logic flow diagram illustrating an exemplary method for monitoring for transmit power control reset criteria.

FIG. 4 thus illustrates a method for evaluating whether the accumulated power control value should be reset. In some embodiments, the accumulated power control value is reset to zero, although other initialization values are possible. Those skilled in the art will appreciate that the method illustrated in FIG. 4, or variants thereof, may be combined, in some embodiments of the invention, with the method illustrated in FIG. 3.

In any case, each iteration of the method pictured in FIG. 4 begins with an evaluation of whether the serving cell has changed, as shown at block 410. (Of course, the pictured evaluations in blocks 410-460 may be performed in any order.) If so, control passes to block 470, where the accumulated power control value is reset. If not, then additional criteria for resetting the accumulated power control value are evaluated in a similar fashion. Thus, the mobile station determines whether uplink synchronization was lost, at block 420, whether the time since a last transmission exceeds a pre-determined threshold, at block 430, and whether a new power control parameter was received from the serving base station, at block 440. Similarly, the mobile station evaluates whether it has left or entered active state, at block 450, and whether it has received an absolute power offset command from the base station, at block 460. If any of these reset criteria are met, then the accumulated power control value is reset, at block 470. Otherwise, the criteria continue to be re-evaluated.

The various methods described above, as well as variations thereof, may be implemented on mobile terminals, such as the mobile terminal 200 pictured in FIG. 2, configured for operation in a wireless communication system employing closed-loop power control. The present invention may, of course, be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

What is claimed is:

1. A method for controlling transmit power at a mobile terminal in wireless communication system where a transmission bandwidth allocated for transmissions by the mobile terminal is variable per transmission, and where the transmit power applied by the mobile terminal depends on an allocated transmission bandwidth, radio propagation conditions, an accumulated power control value, and a maximum transmit power for the mobile terminal, the method being implemented by the mobile terminal and comprising:

receiving a plurality of transmit power control commands, each transmit power control command directing an adjustment in transmit power relative to a prior transmission by the mobile terminal;

calculating transmit power settings for each transmission by the mobile terminal as the lesser of the maximum transmit power for the mobile terminal, and a transmitter output power calculated as a function of the bandwidth allocated for the transmission and the accumulated power control value; and when the mobile terminal is in a power-limited state due to either its transmission bandwidth or radio propagation conditions, wherein the power-limited state requires the mobile terminal to transmit at its maximum transmit power:

adjusting the accumulated power control value when the transmit power control command directs a negative adjustment in transmit power; and ignoring the transmit power control command when the transmit power control command directs a positive adjustment in transmit power so that the accumulated power control value is not adjusted when the transmit power control command directs a positive adjustment in transmit power;

wherein ignoring transmit power control commands that direct a positive adjustment in transmit power reduces the time until the mobile terminal exits the power-limited state when the transmission bandwidth, radio propagation conditions, or both, change, causing the maximum transmit power to no longer be required for transmissions by the mobile terminal.

2. The method of claim 1, wherein receiving a plurality of transmit power control commands comprises receiving a control channel from a serving base station and extracting the transmit power control commands from the control channel.

3. The method of claim 2, wherein extracting the transmit power control commands from the control channel comprises extracting the transmit power control commands according to a scheduling assignment format or a power control command format.

4. The method of claim 1, wherein the transmitter output power is also calculated as a function of at least one of a current transmission path loss estimate and a modulation coding scheme for the transmission.

5. The method of claim 1, further comprising receiving one or more offset values from a serving base station, wherein the transmit power settings are further calculated based on the one or more offset values.

6. The method of claim 5, wherein the one or more offset values include a cell-specific transmit power offset, a mobile terminal-specific transmit power offset, or both.

7. The method of claim 1, wherein the method further comprises:
monitoring for an occurrence of one or more pre-determined transmit power control reset criteria; and
resetting the accumulated power control value to a pre-determined value in response to each said occurrence.

8. The method of claim 7, wherein the pre-determined transmit power control reset criteria include at least one of a change in serving cell for the mobile terminal, a loss of uplink synchronization, elapse of a pre-determined period with no transmissions by the mobile terminal, receipt of a changed power control parameter from a serving cell, and receipt of a transmit power control command specifying an absolute power offset instead of a relative power adjustment.

9. A mobile terminal for use in a wireless communication network where a transmission bandwidth allocated for transmissions by the mobile terminal is variable per transmission, and where the transmit power applied by the mobile terminal depends on an allocated transmission bandwidth, radio propagation conditions, an accumulated power control value, and a maximum transmit power for the mobile terminal, the mobile terminal comprising:
a radio transceiver; and
a controller that is configured to:
receive a plurality of transmit power control commands via the radio transceiver, each transmit power control command directing an adjustment in transmit power relative to a prior transmission by the mobile terminal;
calculate transmit power settings for each transmission by the mobile terminal as the lesser of the maximum transmit power for the mobile terminal, and a transmitter output power calculated as a function of the bandwidth allocated for the transmission and the accumulated power control value; and
when the mobile terminal is in a power-limited state due to either its transmission bandwidth or radio propagation conditions, wherein the power-limited state requires the mobile terminal to transmit at its maximum transmit power:
adjust the accumulated power control value when the transmit power control command directs a negative adjustment in transmit power; and
ignore the transmit power control command when the transmit power control command directs a positive adjustment in transmit power so that the accumulated power control value is not adjusted when the transmit power control command directs a positive adjustment in transmit power;
wherein ignoring transmit power control commands that direct a positive adjustment in transmit power reduces the time until the mobile terminal exits the power-limited state when the transmission bandwidth, radio propagation conditions, or both, change, causing the maximum transmit power to no longer be required for transmissions by the mobile terminal.

10. The mobile terminal of claim 9, wherein the radio transceiver is configured to receive a control channel from a serving base station and extract the transmit power control commands from the control channel.

11. The mobile terminal of claim 10, wherein the radio transceiver is configured to extract the transmit power control commands from the control channel according to a scheduling assignment format or a power control command format.

12. The mobile terminal of claim 9, wherein the controller is further configured to receive, via the radio transceiver, one or more offset values from a serving base station, wherein the transmit power settings are further calculated based on the one or more offset values.

13. The mobile terminal of claim 12, wherein the one or more offset values include a cell-specific transmit power offset, a mobile terminal-specific transmit power offset, or both.

14. The mobile terminal of claim 9, wherein the controller is further configured to:
monitor for an occurrence of one or more pre-determined transmit power control reset criteria; and
reset the accumulated power control value to a pre-determined value in response to each said occurrence.

15. The mobile terminal of claim 14, wherein the pre-determined transmit power control reset criteria include at least one of a change in serving cell for the mobile terminal, a loss of uplink synchronization, elapse of a pre-determined period with no transmissions by the mobile terminal, receipt of a changed power control parameter from a serving cell, and receipt of a transmit power control command specifying an absolute power offset instead of a relative power adjustment.

* * * * *

UNITED STATES PATENT AND TRADEMARK OFFICE
CERTIFICATE OF CORRECTION

| | | |
|---|---|---|
| PATENT NO. | : 8,644,874 B2 | Page 1 of 1 |
| APPLICATION NO. | : 12/811736 | |
| DATED | : February 4, 2014 | |
| INVENTOR(S) | : Englund et al. | |

It is certified that error appears in the above-identified patent and that said Letters Patent is hereby corrected as shown below:

On the Title Page

Item (75), under "Inventors", in Column 1, Line 1, delete "Linkoping" and insert -- Linköping --, therefor.

Item (75), under "Inventors", in Column 1, Line 3, delete "Furuskar," and insert -- Furuskär, --, therefor.

Item (75), under "Inventors", in Column 1, Line 5, delete "Linkoping" and insert -- Linköping --, therefor.

In the Claims

In Column 10, Line 9, in Claim 1, after "terminal in", insert -- a --.

Signed and Sealed this
Twentieth Day of October, 2015

Michelle K. Lee
*Director of the United States Patent and Trademark Office*